United States Patent Office 3,700,460
Patented Oct. 24, 1972

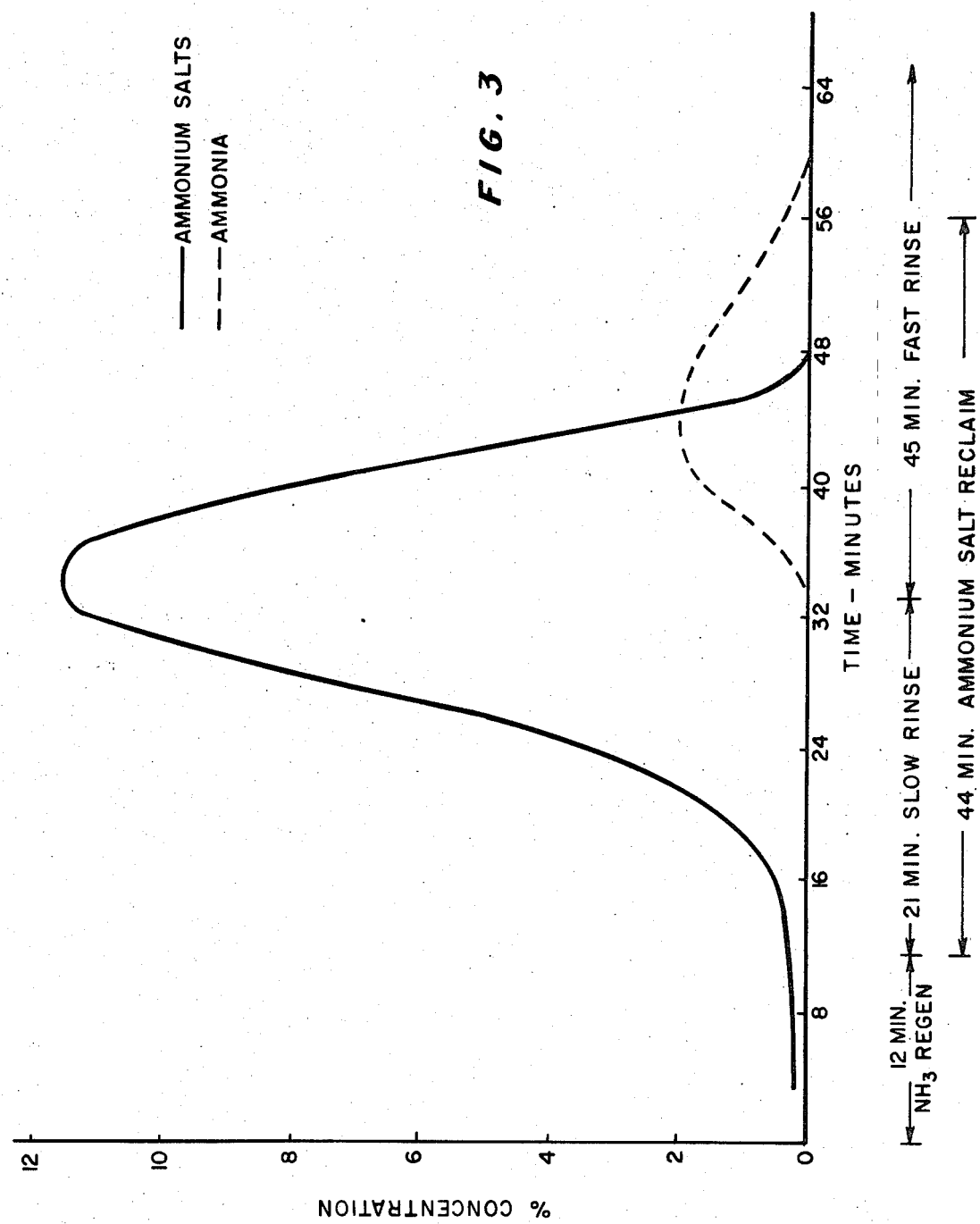

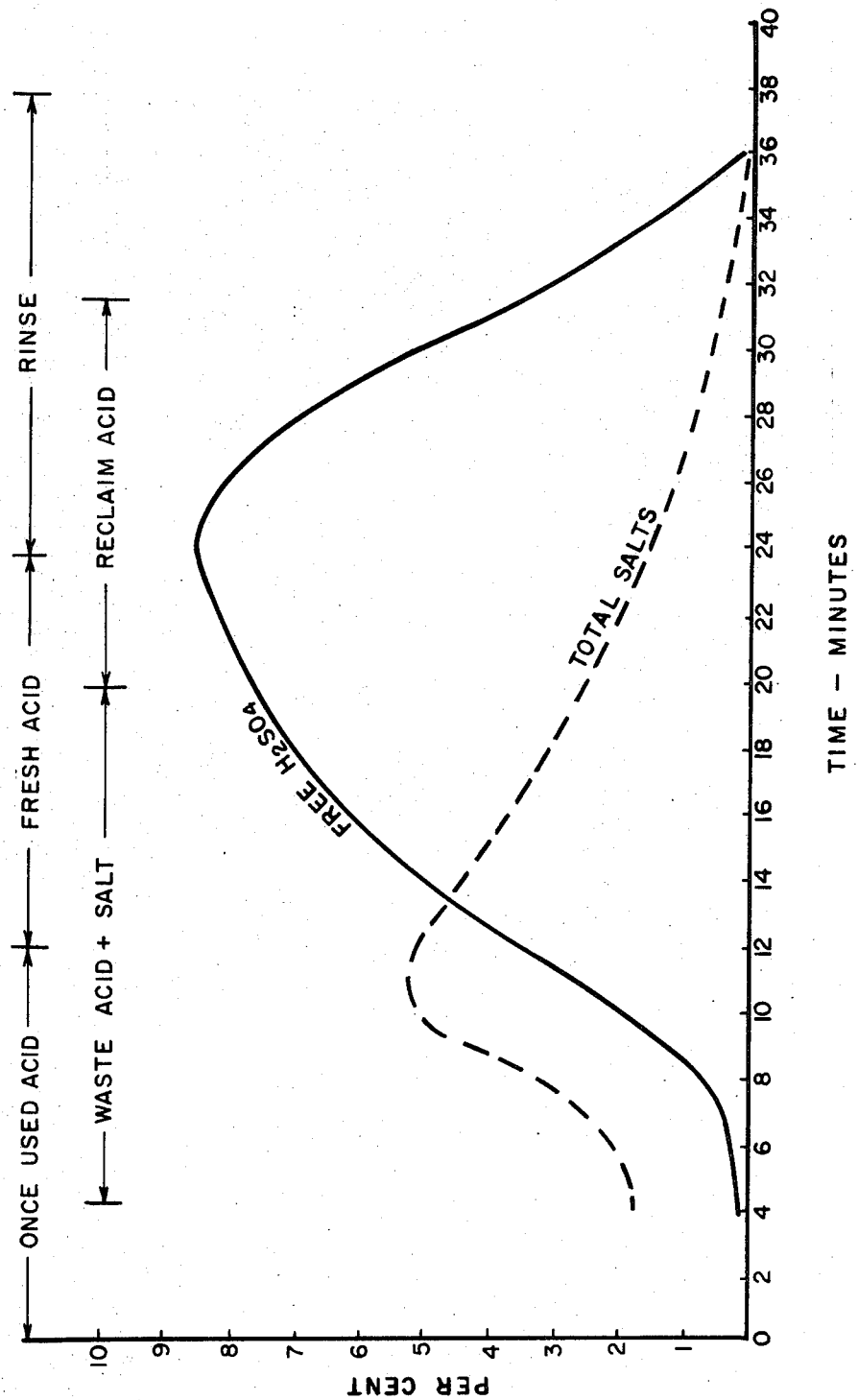

3,700,460
ION EXCHANGE TREATMENT OF SUGAR CONTAINING SOLUTIONS AND PRODUCTION OF A LIQUID FERTILIZER
Stanley E. Bichsel and Tim D. Carpenter, Colorado Springs, Colo., assignors to Holly Sugar Corporation, Colorado Springs, Colo.
Filed June 28, 1968, Ser. No. 750,434
Int. Cl. C05c 3/00
U.S. Cl. 99—2
1 Claim

ABSTRACT OF THE DISCLOSURE

In the ion exchange treatment of sugar containing liquids, to remove non-sugar impurities, the spent anion resins are regenerated by an aqueous ammonia solution to recover an ammonium salt, as in part through a succeeding water rinse, and the spent cation resins are contacted with the ammonium salt solution to reconstitute the impurities, including betaine and amino acids, for use on beet pulp as a food for cattle. The cation resins are thus regenerated to the ammonium form and are converted to the hydrogen form by aqueous sulfuric acid, which forms ammonium sulfate for use in a liquid fertilizer. The initial portion of the aqueous sulfuric acid regenerant is once used acid, thus reducing the cost of acid regeneration. The nitrogen content of the ammonium sulfate solution is increased by the addition of ammonia, while other water soluble fertilizer chemicals, such as phosphate and potassium, may be added, to produce a more commercially acceptable liquid fertilizer.

This invention relates to the processing of sugar containing liquids, and more particularly to the ion exchange treatment of, and utilization of the normally waste material resulting from the ion exchange treatment of, at least a portion of the sugar containing liquids produced in the processing of a sugar containing vegetable product, such as sugar beets or sugar cane.

Although this invention is described more particularly hereinafter as applied to sugar containing liquids which are produced from sugar beets, it will be understood that the ion exchange process and the utilization of the ion exchange waste materials, in accordance with this invention, may be utilized in the treatment of sugar containing liquids which are produced from sugar containing plants, such as sugar cane, certain corn varieties, sorghum, etc.

The treatment of at least a portion of the sugar containing liquids produced in the processing of sugar beets has, for a number of years, been attractive to the operators of sugar beet processing plants. Thus, in the 1940's, a total of six beet sugar factories had partial or full size commercial ion exchange installations, but by 1950, all of these operations had been discontinued. The reasons for such discontinuances included the high cost of ion exchange regenerants, the short life of the ion exchange resins, uneconomical white sugar to molasses cost ratios and the inadequacy of ion exchange equipment. More recently, considerable progress has been made in formulating ion exchange resins having greater physical and chemical stability, while basic ion exchange equipment, as well as support equipment, have been improved, which concomitantly overcame the uneconomical white sugar to molasses cost ratios. Also, in this interium time, a definite decrease in beet quality, due primarily to changing agronomic practices, has been noticed. Thus, in order to remove additional impurities from the sugar containing liquids or beet juice, supplementary means for increasing the extraction of sugar in the factory, e.g. increasing the elimination of impurities, has become more and more important. Although the improvements in the ion exchange resins and in the basic ion exchange equipment, as well as support equipment, have solved some of the above problems, the high cost of ion exchange regenerants still remains. Previously, the residue from regeneration has been discharged to a sewer or to other types of waste disposal, without any attempt to recover any of the constituents thereof for a useful purpose. Discharge of such residue through a sewage system merely adds to the already polluted condition of the streams and rivers of this fair country, while waste disposal proposals have not met with success. Such residue, when discharged into waste ponds or the like, have also produced odoriforus air pollutants which are vigorously objected to by both adjacent and somewhat remote land owners.

The present invention solves both the problem of the high cost of ion exchange regenerants and the air pollution problem, through the conversion of ion exchange regeneration waste material into a liquid fertilizer which contains ammonium salts, particularly ammonium sulfates, produced during regeneration, in an ammonia neutralized fertilizer base solution having a lower nitrogen content, as in the neighborhood of 2.3%, such nitrogen being combined with the 11% ammonium sulfate in solution. This nitrogen content is preferably increased by the addition of ammonia to the fertilizer base solution, such as to a nitrogen content in the neighborhood of 20%, this nitrogen content including the nitrogen in the ammonium sulfate. Other water soluble fertilizer chemicals, such as phosphates, may also be added, in order to produce more commercially acceptable liquid fertilizer.

By the present invention, the ion exchange process itself is also improved, through the use of the residue of the ammonium hydroxide regenerant, used in regenerating the spent anion resin bed, to strip betaine, amino acids, calcium, sodium, potassium and the like from the spent cation resin beds, prior to regeneration of the latter by acid. The betaine, amino acids, calcium, sodium, potassium and the like are conveniently utilized as a supplement for feed for cattle and the like, as by addition of a concentrated solution produced therefrom to beet pulp prior to drying the latter. Additional improvements of this invention, in the ion exchange process itself, include the recirculation of partly used acid regenerant for the spent cation resin bed.

Among the objects of this invention are to provide a novel ion exchange process, particularly useful in the treatment of sugar containing liquids produced in the extraction of sugar from sugar beets, sugar cane or other sugar bearing plants; to provide such a process by which the total white sugar production of the factory can be increased; to provide a novel process of regenerating spent anion resin beds and spent cation resin beds, by which the amount of regenerant used is decreased; to provide a novel process of treating the residue from the regeneration of ion exchange resins used in the treatment of sugar containing liquids produced during the extraction of sugar from sugar beets, sugar cane or other sugar bearing plants, in order to provide a commercially useful product, namely a liquid fertilizer; to provide a process for treating such residues by which a liquid fertilizer produced is made more commercially acceptable; and to provide each such process which will be effective and efficient in operation.

Additional objects and the novel features of this invention will become apparent from the description which follows, taken in conjunction with the accompanying drawings, in which:

FIG. 3 is a graph showing the concentration of ammonium salts and ammonia in the effluent from an anion resin, ion exchange bed, during regeneration by an ammonia solution and subsequent rinsing; and FIG. 4 is a graph showing the concentration of free acid and total salts in the effluent from a cation resin bed being regenerated.

Figure 1:
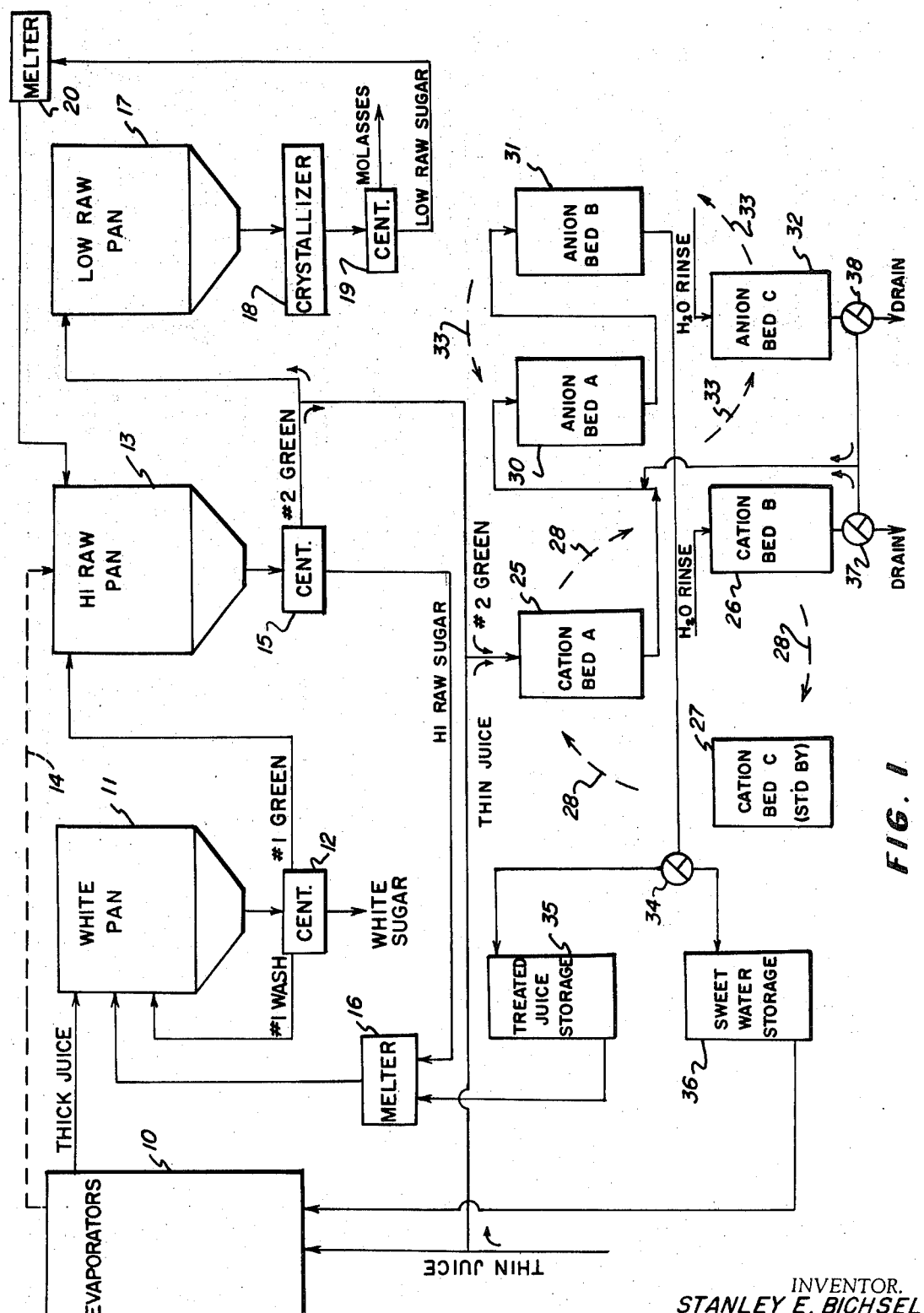
FIG. 1 is a diagram illustrating the treatment of so-called thin juice, during the extraction of sugar from sugar beets, to incorporate an ion exchange process involving cation exchange resins and anion exchange resins in accordance with this invention.

An ion exchange process may be incorporated in the treatment of a sugar containing liquid, such as thin juice, in a beet sugar factory, in order to increase the production of white sugar and also to decrease the amount of molasses ultimately produced. The application of the ion exchange process will be better understood by first describing the operations, illustrated in FIG. 1, of a conventional beet sugar factory, in which the thin juice is supplied to multiple effect evaporators 10 to produce what is known as thick juice, the majority of which is transferred to a white pan 11, or number of vacuum pans, in which the thick juice is further evaporated and crystallization of the sugar induced. Upon treatment in one or more centrifugals 12, the liquid contained with the crystallized sugar is thrown off by centrifugal force, being known as No. 1 green, while the crystallized sugar is then washed with hot water, the result of this washing being referred to as No. 1 wash, which is returned to the white pan 11. The liquid thrown off during centrifuging, known as No. 1 green, is supplied to a high raw pan 13, or number of vacuum pans. Conventionally, as with beets of low quality, a portion of the thick juice from the multiple effect evaporators 10, as indicated by the dotted line 14, is also fed to the high raw pan 13, to increase the sugar content in the high raw pan. In this way, the impurity loading on the white pan 11 is also decreased.

After the discharge of the No. 1 green liquid and the No. 1 wash liquid from centrifugals 12, the crystallized sugar is discharged as white sugar and, in a properly operated factory, will be a commercially pure white sugar. This sugar is transferred to driers and then to storage or packaging in a conventional manner.

The sugar solution in the high raw pan 13 is boiled further and then crystallization induced, after which the mixture of crystallized sugar, impurities and the remaining water is treated in one or more centrifugals 15, with the liquid removed by centrifuging, known as No. 2 green, being transferred to a low raw vacuum pan 17. Then, the crystallized sugar which contains impurities and therefore is known as high raw sugar, is discharged from the centrifugals and, as through a sugar melter 16, transferred in solution to the white pan 11.

The sugar solution in the low raw pan 17 is further evaporated and crystallization induced, after which the contents of the low raw pan are discharged to a crystallizer 18 and then treated in a series of centrifugals 19. The molasses produced by the centrifugals 19 is much lower in sugar content and higher in impurities than either the No. 1 green or the No. 2 green and may be utilized for cattle feed, as by spraying onto dried beet pulp. The low raw sugar produced by the centrifugals 19 is transferred, as through a sugar melter 20, to high raw pan 13. As will be evident, the ultimate product desired, i.e. the white sugar, is all obtained from the centrifugal treatment of sugar crystallized in the white pan 11, while the crystallized products of both the high raw pan and the low raw pan are transferred to the next pan above, and the liquid thrown off by centrifugal treatment is transferred from the white pan and the high raw pan to the pan below. Thus, the treatment of beet sugar is not only a cyclic process, but also involves a recirculation of the various products.

In many beet sugar factories, the low raw molasses discharged from the centrifugals 19 is treated in a so-called Steffens house, in which quicklime or CaO is formed by thermal decomposition of lime rock or $CaCO_3$, with the quicklime reacting with the sugar of the molasses to produce an insoluble saccharate, which is recovered by filtering and then further treated, as by $CO_2$, to reintroduce the sugar into the circulating system.

In applying the ion exchange process to the beet sugar factory operation just described, the transfer of a portion of thick juice to the high raw pan, as indicated by the dotted line 14, is eliminated, so that the feed to the high raw pan 13 then becomes merely No. 1 green and low raw sugar. Since the No. 2 green liquid, as about 82.8 brix, is too concentrated or thick for effective ion exchange treatment, it is diluted by a portion of the thin juice, as at about 10.6 brix, diverted from the evaporators 10, and the mixture thus produced, as at about 30 brix, is passed through a cation resin bed, such as bed 25, which is also designated as cation resin bed A, since additional cation resin beds 26 and 27, designated as cation bed B and cation bed C, respectively, are also utilized in addition to the cation resin bed to which the juice being treated is being passed. Thus, a second cation resin bed 26, which is bed B at the moment, is being regenerated, while a third cation bed 27, which is bed C at the moment, is on standby. When the cation resin bed in use is exhausted, the flow of solution or juice to be treated is transferred to the cation resin bed previously on standby and the exhausted bed then regenerated, while the cation bed just previously regenerated is transferred to standby, as in the merry-go-round arrangement indicated by the dotted arcuate arrows 28.

From the cation bed in use, such as bed 25, the sugar containing liquid treated therein is transferred to a primary anion exchange resin bed, such as bed 30, which is also designated as anion bed A, from which the sugar containing liquid is transferred to a secondary anion resin exchange bed, such as bed 31, which is also designated as anion bed B. A third anion resin exchange bed 32, also designated as anion bed C, is being regenerated, while the remaining two anion beds are in use, so that when the primary anion bed, such as anion bed A, becomes exhausted, the piping may instead be connected to a fresh bed, such as anion bed C, with anion bed C then becoming the secondary bed and anion bed A then undergoing regeneration, with partially exhausted anion bed B becoming the primary bed. Thus each anion bed is utilized sequentially as a secondary bed, a primary bed and then a regeneration bed, as indicated by the dotted arcuate arrows 33. As shown, the flow of the sugar containing liquid is preferably downwardly through each cation and anion bed, although it will be understood that, in addition to batch types of beds, as shown, continuous or semi-continuous types of beds may be utilized, such as the semi-continuous type in which the resin is moved as slugs from one fixed column to another or the resin is moved as slugs in a circular route within a circular fixed column.

From the secondary anion bed, such as anion bed B, as shown, the treated juice is transferred, as through a three-way valve 34, to a treated juice storage tank 35 or a sweet water storage tank 36, with a conventional heat exchanger (not shown) interposed, so that the thin juice and No. 2 green may be cooled, prior to ion exchange, and the treated juice heated. The treated juice is transferred, as to high raw melter 16, for feed in appropriate volume to the white pan 11, while the sweet water is fed, at an appropriate rate of flow, to evaporators 10. Three-way valve 34 may be controlled through a Brix recorder, so that treated juice above about 18 Brix will be transferred to treated juice storage tank 35, but below about 18 Brix will be transferred to sweet water storage tank 36.

Prior to actual regeneration, the sugar containing solution remaining in both the anion bed and cation bed is displaced, as through a water rinse, as indicated. The water rinse for the cation bed may be well water or the like, but the water utilized for rinsing the sugar containing liquid from the anion bed is preferably decationized water. The sweet water thus produced is transferred to the incoming feed to the anion resin beds, as indicated, or discarded, depending upon the amount of sugar therein, being controlled by three-way valves 37 and 38, respectively. Thus, if the sugar in the rinse effluent is greater than about 1.0%, the rinse effluent may be sent to the anion exchange beds, but if less than about 1.0%, it may be diverted to drains, as indicated. The three-way valves 37 and 38 may each be controlled through a concentration recorder controller. If desired, all or a portion of the sweet water produced by rinsing the 1% sugar may be transferred to the sweet water storage tank 36, with heat exchangers (not shown) interposed, in order to cool the incoming feed to the ion exchange beds and heat the sweet water.

The resin of the cation beds 25, 26 and 27, which is preferably a strong resin, as of the sulphonic type, has available H+, which is exchanged for amphoteric and cationic impurities, such as amino acids and betaine or K, Na, Ca and Mg of inorganic salts, in the order of usual occurrence, with the result that the K, Na, Ca and Mg, as well as the amino acids and betaine combine with the resin. The resin of the anion beds 30, 31 and 32, is preferably a weak anion resin, as of the tertiary amine rather than the strong quaternary amine type, but has an enhanced physical and chemical stability, as representative of the epoxy amine resins and those having a macroporous polystyrene matrix. The anion resin has available OH− for exchange with chlorides, sulfates, oxalates, malates, citrates and weak organic acids, such as formic, acetic, lactic and carbonic, not necessarily in the order of usual occurrence.

To determine when a cation resin bed is exhausted and should be regenerated, a conductivity meter and chart may be utilized, since exhaustion of the resin is indicated by a rapid decrease in conductivity, i.e. a decrease in acidity generated by the cation and a simultaneous leakage of amphoteric and weakly cationic compounds, principally amino acids and betaine.

To determine when a secondary anion bed B is sufficiently exhausted for rotation into a primary position, a pH meter and chart may be utilized to monitor the secondary bed effluent. Exhaustion of secondary anion bed B is indicated by a rapid decrease in pH, as from 9.5 to 7.5 pH. This pH decrease in the bed effluent is caused by breakthrough of the free acids, the anion bed no longer having sufficient available OH− for exchange with the acid radicals.

It will be understood, of course, that a greater proportion of the thin juice may be treated by ion exchange and that other sugar containing liquids may be treated by ion exchange, in addition to the thin juice and the No. 2 green syrup. However, the arrangement shown has resulted in marked advantages in operations carried out at the Hamilton City, Calif., plant of the Holly Sugar Corporation, as shown by the comparative figures of the following Table I, which is based on twenty-four hours or one day's operation of that plant, which is adapted to handle 2000 tons of sugar beets daily.

TABLE I

[Treatment of 2,000 tons beets per day]

|  | Without ion exchange | | | With ion exchange | | |
| --- | --- | --- | --- | --- | --- | --- |
|  | Sugars, tons/day | Non-sugars tons/day | Purity, percent | Sugar, tons/day | Non-sugars, tons/day | Purity, percent |
| White sugar produced | 195.2 |  |  | 231.0 |  |  |
| Thin juice | 259.3 | 38.8 | 87.0 | 259.3 | 38.8 | 87.0 |
| Thin juice to evaporators | 259.3 | 38.8 | 87.0 | 231.6 | 34.6 | 87.0 |
| Thin juice to ion exchange |  |  |  | 27.7 | 4.1 | 87.0 |
| Thick juice to white pan | 171.4 | 25.6 | 87.0 | 260.2 | 36.0 | 87.8 |
| Thick juice to hi raw pan | 87.9 | 13.2 | 87.0 |  |  |  |
| Hi raw sugar to white pan | 219.0 | 4.5 | 98.0 | 192.7 | 3.9 | 98.0 |
| Low raw sugar to hi raw pan | 101.1 | 6.5 | 94.0 | 49.2 | 3.1 | 94.0 |
| Treated juice to white pan |  |  |  | 66.8 | 3.2 | 95.4 |
| Sweet water to evaporator |  |  |  | 28.6 | 1.4 | 95.4 |
| No. 2 green to ion exchange |  |  |  | 68.5 | 19.9 | 77.3 |
| No. 1 green to hi raw pan | 195.2 | 30.1 | 86.6 | 288.8 | 43.1 | 87.0 |
| No. 2 green to low raw pan | 165.2 | 45.3 | 78.5 | 76.9 | 22.4 | 77.5 |
| Low raw molasses | 64.1 | 38.8 | 62.3 | 27.7 | 19.3 | 59.0 |
| Non-sugars eliminated |  |  |  |  | 19.5 |  |

As shown by Table I, the amount of white sugar produced by ion exchange increased from 195.2 to 231.0 tons per day, an increase of 18.5%, while the impurities rejected in the molasses produced by centrifuging the low raw sugar decreased by 50%, which was approximately the amount of impurities or non-sugars eliminated by ion exchange. It will be noted that, with ion exchange, the amount of thick juice supplied to the white pan increased by the amount no longer supplied to the high raw pan, while the ion exchange treated juice supplied to the white pan, as well as the sweet water from ion exchange supplied to the evaporators, had a purity in excess of the thin juice itself. The amount of No. 1 green syrup supplied to the high raw pan increased considerably but to amount of No. 2 green syrup supplied to the low raw pan decreased considerably, when ion exchange was incorporated in the plant.

As will be evident from Table II, below, the total amount of sugar boiled and non-sugars boiled was approximately the same for the plant operating with and without ion exchange, but the load on the white pan was increased considerably, while the load on the high raw pan was decreased, and the load on the low raw pan was considerably decreased. Thus, for a sugar beet processing plant specifically designed to accommodate the ion exchange process, as of the type of FIG. 1, the capacity of the white pans, high raw pans and low raw pans should be considered accordingly.

TABLE II

|  | Without ion exchange | | | With ion exchange | | |
| --- | --- | --- | --- | --- | --- | --- |
|  | Sugar, tons/day | Non-sugars, tons/day | Purity, percent | Sugar, tons/day | Non-sugar, tons/day | Purity, percent |
| White pan | 390.4 | 30.1 | 92.8 | 519.8 | 43.1 | 92.3 |
| Hi raw pan | 384.2 | 49.8 | 88.5 | 338.1 | 46.2 | 88.0 |
| Low raw pan | 165.2 | 45.3 | 78.5 | 76.9 | 22.4 | 77.5 |
| Evaporators | 259.3 | 38.8 | 87.0 | 260.2 | 36.0 | 87.8 |
| Sugar boiled | 939.8 |  |  | 934.8 |  |  |
| Non-sugars boiled |  | 125.2 |  |  | 111.7 |  |

Figure 2:
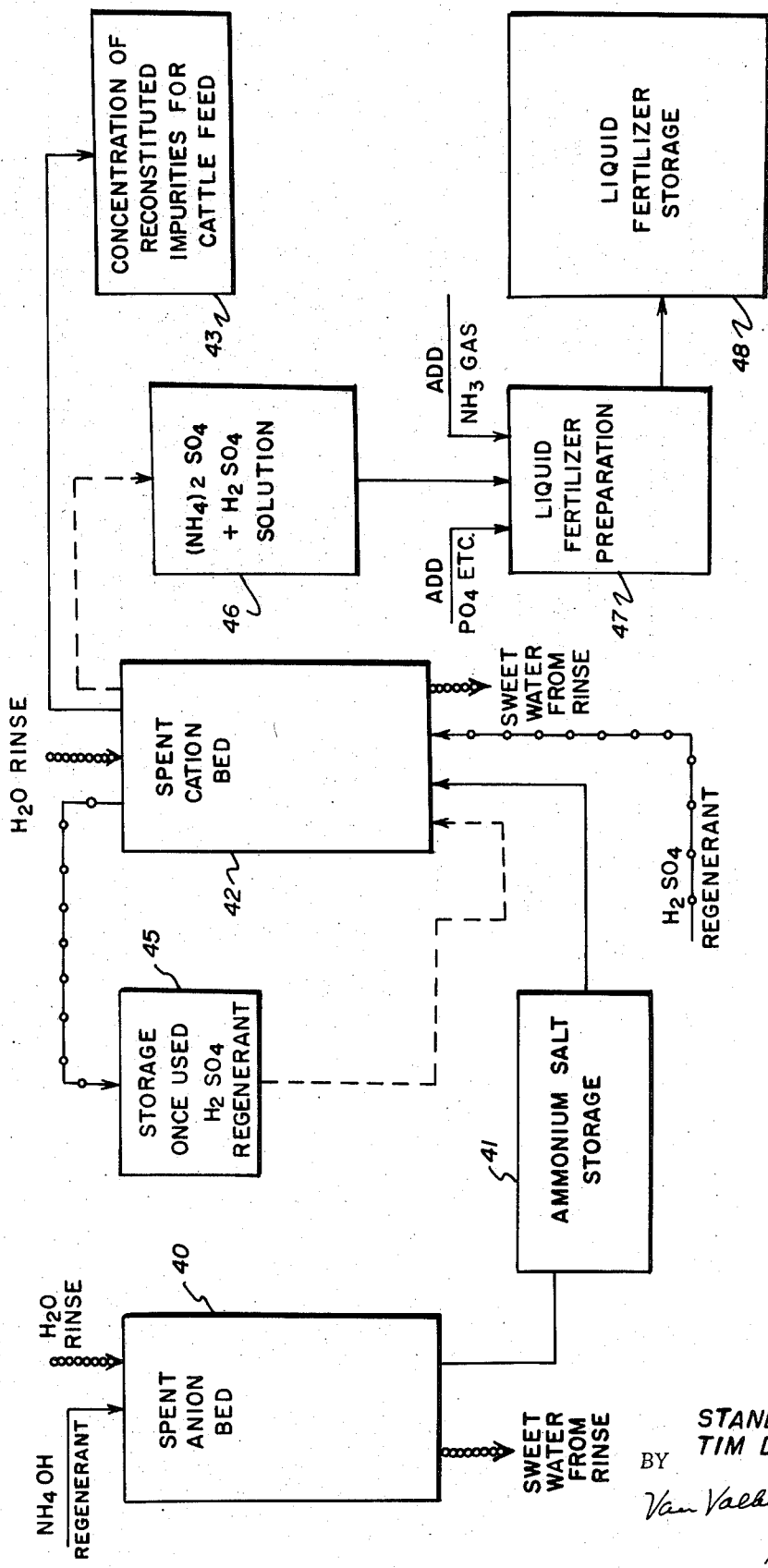
FIG. 2 is a diagram of the regeneration of a spent anion resin bed and a spent cation resin bed, together with the treatment of the residue from regeneration, to produce a commercially acceptable liquid fertilizer, also in accordance with this invention.

In further accordance with this invention, the anion resin beds and the cation resin beds are regenerated in the manner illustrated in FIG. 2. As indicated, a spent anion bed 40 is first rinsed by a downflow of decatonized water, to remove the sugar containing solution remaining in the resin. A flow of 0.24 gallons per cubic foot of resin per minute of decatonized water, as for 40 minutes, may be utilized for this rinse. The anion bed may then be backwashed by an upflow rinse to remove gas formed in the resin bed and also redistribute the resin particles, as at 0.36 gallon per cubic foot of resin per minute, as for 45 minutes, after which the levitated resin bed may be allowed to settle for 7 minutes. The water used for this backwash may be sent to waste. Next, an ammonium hydroxide regenerant, such as containing 6% ammonia ($NH_3$) but made up from a more concentrated solution, such as 23% ammonia ($NH_3$), produced by introducing ammonia gas through a sparger into a tank of water, may be passed downwardly through the spent anion bed, as for 12 to 14 minutes, so that the $OH^-$ ions will attach to the resin and displace the acid radicals attached thereto during ion exchange and form ammonium salts, which are stored, as in a tank 41, because of the periodic regeneration of the various beds. An amount of ammonia solution regenerant of about 0.32 gallon per cubic foot of resin per minute, or 168 gallons per minute in the installation described above, amounting to 100% to 110% of theoretical resin equivalent capacity, may be utilized. Regenerant may be removed from the resin column by a slow downflow rinse, as at 0.22 gallon per cubic foot resin per minute, or 123 gallons per minute in the installation described above, as for 21 minutes, while the last traces of ammonia may be removed by a fast downflow rinse with decatonized water, as at 0.36 gallon per cubic foot of resin per minute for 45 minutes. The regenerated cation resin bed is then placed on a standby basis, as in the case of cation bed C of FIG. 2.

During regeneration, ammonium salts of the juice impurity anions are reclaimed, along with any unconverted ammonium hydroxide. The fraction of the liquid reclaimed may be essentially the effluent produced during the slow downflow rinse, but including the ammonia solution remaining in the bed at termination of the flow of the ammonia solution, since there is a time lag in the presence of ammonium salts in the effluent in appreciable amounts, as indicated by the graph of FIG. 3, in which the percent concentration of ammonium salts, shown by the solid line, and of unreacted ammonia, shown by the dotted line, is plotted against time. The 12 minutes of ammonia solution regeneration apparently does not produce a sufficient amount of ammonium salts to warrant saving, but as the solution remaining in the bed is displaced by the slow rinse, the amount of ammonium salts in the effluent increases rapidly and then tapers off during the fast rinse, while unused ammonia is apparently pushed out of the bed last. Thus, the effluent may be reclaimed for the period during which the concentration of ammonium salts or unused ammonia exceeds approximately ½%, as for the 44 minute period indicated in FIG. 3.

A spent cation bed 42 is first subjected to a downflow water rinse, again to produce sweet water for transfer to the service anion feed. The dilution passes through the ion exchange system and is diverted to the sweet water tank 36 by a concentration recorder controller. Raw water is suitable to sweeten off or initially rinse a cation resin bed, such as 0.43 gallon per cubic foot of resin per minute, for 26 minutes. This rinse preferably reduces the sugar in the column effluent to less than 1%. Then, the ammonium salt solution from the storage tank 41 is passed, in an upflow direction, through the spent cation bed, it having been found, quite unexpectedly, that the ammonium salt solution resulting from the regeneration of a spent anion bed is effective to reconstitute acids, such as betaine, amino acids and the like, containing feed values suitable for cattle feed from the spent cation bed.

Ion exchange feed non-sugars are reconstituted by exposing the ammonium salts of the anion waste from anion regeneration to the exhausted cation resin, which is loaded with the amphoteric and cationic impurities in the ion exchange feed. Analyses indicate that the relatively high concentration of cationic ammonium ion exchanges for the cationic impurities on the exhausted cation resin, so that the anionic impurity recombines with the released cation and the total impurity molecule is reconstituted. Thus, the exhausted cation resin is now almost entirely regenerated in the ammonium or $NH_4^+$ rather than the hydrogen or $H^+$ form. Such stripping may be accomplished by passing 0.49 gallon per cubic foot of resin per minute of the ammonium salt solution through the cation resin bed, as for 13 minutes. Much of the reconstituted impurities, of course, remain in the cation resin bed and are removed by an upflow, raw water rinse, as at 0.49 gallon per cubic foot of resin per minute, as for 8 minutes. The effluent from both the ammonium salt waste treatment and the rinse following may be transferred to a tank 43, in which or in other appropriate equipment, the effluent is concentrated, as from about 3.5–6.0 Brix to about 60 Brix, prior to spraying onto beet pulp which will be dried for sale as cattle feed. An analysis, which is an average of a number of analyses, of the contents of this ammonia waste stripping stream is shown in Table III below:

TABLE III

[Ammonia waste stripping stream]

| | Milligrams per liter | Percent of dissolved solids |
|---|---|---|
| Na | 2,700 | 7.70 |
| K | 2,760 | 7.90 |
| Ca | 66 | 0.20 |
| Mg | 35 | 0.10 |
| Cl | 5,353 | 15.30 |
| SO₄ | 1,252 | 3.60 |
| Amino-PCA nitrogen total | 822 | 2.36 |
| Total nitrogen | 5,125 | 14.69 |
| Betaine | 6,668 | 19.11 |
| Dissolved solids | 34,884 | 100 |

The high percentage of total nitrogen and betaine, in comparison with Na, K, Ca, Mg, and $SO_4$, is apparent from the above Table III.

The last traces of dissolved solids may then be rinsed from the cation resin bed with a fast downflow raw water rinse, as at 0.73 gallon per cubic foot of resin per minute, for 10 minutes. The cation resin bed may then be backwashed to remove particulate matter and gas and to reclassify the resin, as by an upflow rinse with raw water at 0.73 gallon per cubic foot of resin per minute for 15 minutes. After backwashing, the resin is preferably allowed to settle, as for 4½ minutes.

In the regeneration of the spent cation resin bed, ammonium ion on the resin is exchanged for hydrogen ion of the acid, preferably sulfuric acid, with the result that ammonium sulfate is formed. Since the initial stages of regeneration of a spent cation bed do not require as strong an acid as later on, the once used, reclaimed sulfuric acid regenerant from a storage tank 45 may first be passed upflow through the spent cation bed and the resulting ammonium sulfate and other salts of ammonia may be collected in a tank 46. This first stage of the regeneration may be carried out at 0.71 gallon per cubic foot of resin per minute, for 12 minutes. For the final step of regeneration, a 10% sulfuric acid solution may be utilized, being passed upwardly through the spent cation bed, as at 0.45 gallon per cubic foot of resin per minute, for 12 minutes. The effluent is passed into storage tank 45, together with a portion of the effluent of a rinse, to remove acid from the bed, as at 0.45 gallon per cubic foot of resin per minute for 15 minutes, to produce once used acid. The rinse may be upflow, with decatonized water, at 0.45 gallon per cubic foot of resin per minute for 15 minutes, with a final, fast downflow raw water rinse to remove the last traces of acid, as at 0.73 gallon per cubic foot of resin per minute for 15 minutes. The portion of the effluent passed to ammonium sulfate tank 46 and to once used acid tank 45 need not necessarily coincide with the introduction of the fresh acid, as illustrated by the graph of FIG. 4, showing the free acid, by the solid line, and the total salts, by the broken line, in the effluent. Thus, during the first four minutes of introduction of the once used acid, there may be insufficient salt concentration to warrant saving. Also, for the first 8 minutes of the free acid introduction, the total salts are higher than desired for reclaiming the acid. Thus, waste acid and salt may be passed to tank 46 for a period of 16 minutes and reclaim acid to once used acid tank 45 for the next 12 minutes. The times at which the various effluent streams are diverted to tanks 45 and 46, or discarded, will usually depend upon the conditions at each plant, but FIG. 4 provides a basis from which the operation can be varied to provide a satisfactory operation of other specific plants, in order to achieve economical operation.

Although the ammonia neutralized, ammonium sulfate residue from the ion exchange regeneration containing, for instance, approximately 2.3% nitrogen and 11% ammonium sulfate may be used as a dilute fertilizer, or may be concentrated by evaporation, there are transportation problems in the former and inherent difficulties in the latter. For instance, evaporation in ponds does not cure the problem of air pollution, while enclosed evaporating equipment is substantially as expensive as that utilized to evaporate the sugar solutions, since ammonium sulfate starts to decompose at about 100° C. Since ammonia is available for neutralization and make up and the cost thereof may be recovered directly in the value of a fertilizer having a higher nitrogen content, such as in the neighborhood of 20% nitrogen, additional ammonia gas may be passed into a liquid fertilizer preparation tank 47, until a nitrogen content equal to that desired is produced. In addition, for a more acceptable commercial fertilizer, other constituents, if not already present, such as phosphate and potassium, as in the form of potassium monohydrogen phosphate, or others, if desired, are added. Thus, all of the nitrogen content and sulfur content of the otherwise waste material resulting from the regeneration of ion exchange resins can be recovered in a useable form, e.g. liquid fertilizer.

Since the regeneration cycle of a spent cation bed may require in the neighborhood of 170 minutes, whereas the ammonia solution may be supplied thereto for only 12 to 14 minutes, the amount of time required to produce the ammonia solution for a cation bed regeneration comprises only a small portion of the day. Such converter tanks are ordinarily provided with spargers by which the ammonia gas is introduced into water, and such a tank may be conveniently utilized, during off periods, as the tank 47 for producing a liquid fertilizer solution.

From the foregoing, it will be evident that the processes of this invention fulfill to a marked degree the requirements and objects hereinbefore set forth. Not only is the amount of white sugar produced by a factory increased considerably, but also the molasses, which is to be used for cattle feed, is reduced considerably in amount. Thus, through the ultilization of ammonium sulfate and other nitrogen products of ion exchange regeneration in a liquid fertilizer, not only are the nitrogen and sulfur values recovered in a useable form, thus reducing the high cost of ion exchange regenerants, but also the air pollution problem is overcome. Furthermore, by utilizing the ammonium salt solution resulting from the regeneration of spent anion resin to strip betaine and amino acids from the spent cation resins, the total cost of sulfuric acid for spent cation resin regeneration is reduced, since the acid more readily strips ammonia from the anion resins than Ca, Na, K and the like. In addition, the acid would otherwise produce $CaSO_4$ as a precipitate, to remain inside the bed, with attendant difficulties of removal. The acid is also more effectively utilized by initial regeneration of the spent cation resin by once used acid.

Although a preferred application of ion exchange to a sugar beet factory has been illustrated and described, as well as a preferred process of utilizing the residue from ion exchange regeneration in the production of a commercially acceptable product, i.e. liquid fertilizer, has also been described, it will be understood that numerous variations may be made and that the process of this invention may be applied to the treatment of sugar containing solutions extracted from other plant material, in addition to sugar beets, all without departing from the spirit and scope of this invention.

We claim:

1. A process of producing a fertilizer and an animal food through regenerating spent cation resins and spent anion resins utilized in the removal of non-sugar impurities from a sugar containing solution, which comprises:

regenerating said spent anion resins with an aqueous ammonia solution and recovering an ammonium salt solution thereby produced;

contacting said spent cation resins with said ammonium salt solution to cause said salts to combine with amphoteric and cationic impurities carried by said spent cation resins and to regenerate said spent cation resins in the ammonium form;

contacting the said cation resins, in the ammonium form, with an aqueous sulfuric acid solution to produce ammonium sulfate and regenerate said cation resins in the hydrogen form;

recovering an ammonium sulfate solution produced by said aqueous sulfuric acid;

introducing ammonia and water soluble constituents containing a phosphate, potassium and the like into said recovered ammonium sulfate solution to produce a liquid fertilizer;

recovering a product of the contact of said spent cation resins with said ammonium salt solution in substantial part by an aqueous rinse following said contact, to obtain a solution having on the order of 4.0% to 6.0% dissolved solids; and concentrating said recovered product to a solution having on the order of 60.0% dissolved solids, to provide a liquid suitable for addition to a vegetable product useful as an animal food and the like.

References Cited

UNITED STATES PATENTS

| | | | |
|---|---|---|---|
| 2,050,493 | 9/1936 | Lawrence et al. | 71—51 X |
| 2,366,650 | 1/1945 | Rawlings et al. | 127—46.1 X |
| 2,375,164 | 5/1945 | Bennett | 127—46.1 X |
| 2,375,165 | 5/1945 | Nees et al. | 127—46.1 |
| 2,413,844 | 1/1947 | Rawlings | 127—46.1 |
| 2,413,784 | 1/1947 | Rawlings et al. | 127—46.1 |
| 2,413,791 | 1/1947 | Shabor | 127—46.1 X |
| 2,482,765 | 9/1949 | Haagensen | 127—46.1 |
| 2,560,504 | 7/1951 | Day et al. | 210—32 X |
| 2,678,288 | 5/1954 | Cotton et al. | 127—46.1 |
| 3,024,100 | 3/1962 | Lanssuth | 71—1 X |
| 3,130,082 | 4/1964 | Senbig | 71—26 X |
| 3,206,298 | 9/1965 | Smalber | 71—51 X |
| 3,325,289 | 6/1967 | Lyons | 99—6 |

FOREIGN PATENTS

| | | | |
|---|---|---|---|
| 1,294,952 | 4/1961 | France | 71—25 |

REUBEN FRIEDMAN, Primary Examiner

R. BARNES, Assistant Examiner

U.S. Cl. X.R.

23—119; 71—61, 63; 126—46 A